May 26, 1959   F. PETERMICHL ET AL   2,888,639
SWITCH TESTING APPARATUS
Filed Jan. 7, 1955
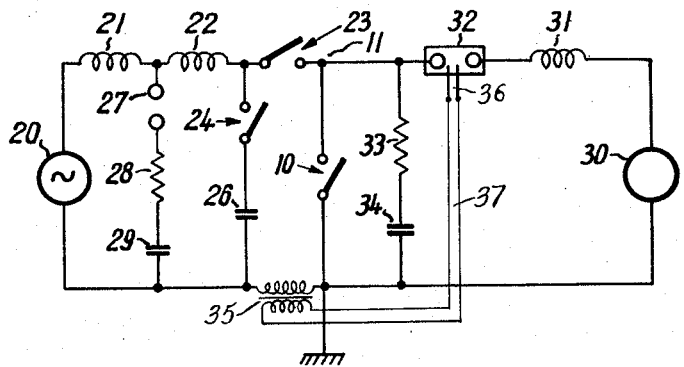
Inventors:
FRANZ PETERMICHL AND
ERNST SLAMECKA
BY:

2,888,639

SWITCH TESTING APPARATUS

Franz Petermichl and Ernst Slamecka, Kassel, Germany, assignors to Licentia Patent-Verwaltungs-G.m.b.H., Hamburg, Germany Application January 7, 1955, Serial No. 492,252

Claims priority, application Germany January 11, 1954

1 Claim. (Cl. 324—28)

The present invention relates to a switch testing apparatus. More particularly, the present invention relates to an apparatus for testing switches for both high current capacity and high voltage rating, the testing circuit having separate high voltage and high current sources.

In conventional switch testing apparatus, the switches are tested for their interrupting ability by having a high current pass therethrough, and after opening them, when the current reaches its zero value by having a high voltage applied thereacross in their open position. The voltage corresponds to the normal recovery voltage under conditions of short circuit in actual operation. Of course, it is apparent that the magnitude of the current and the voltage applied is a factor which determines the interrupting capacity of the switch.

It is apparent that it would be uneconomical to use one source which provides both high voltage and high current. If that were the case the power output requirements of the supply circuit would be economically unfeasible.

Accordingly, the switches are tested by means of separate sources for the high current and for the high voltage. If the independent current and voltage sources are arranged in the same testing circuit, it is apparent that the circuit must be arranged so that there is no chance of interaction between the independent power sources.

Accordingly, it is an object of the present invention to provide a switch testing apparatus which has independent current and voltage sources and which operates without any interaction between the independent sources.

A further object of the present invention is to provide apparatus wherein a switch may be tested for its interrupting capacity using separate current and voltage sources while protecting the high current source from the application of high voltage.

Still another object of the present invention is to provide a switch testing apparatus wherein a switch is tested for its high voltage and high current interrupting capacity, having an independent current and voltage source, wherein the probability of the high voltage being applied to the high current source is reduced by decreasing the self-resonant frequency of the high current circuit.

Another object of the present invention is to provide a switch testing apparatus for testing a switch for high current and high voltage interrupting capacity, using independent current and voltage sources, wherein the probability of the high voltage causing a breakdown in the high current circuit is reduced and in the event of the improbable breakdown, having means for shortcircuiting the high current source.

With the above objects in mind, the present invention mainly consists of a switch testing apparatus including a testing branch circuit adapted to contain the switch to be tested, a high current circuit including a high current source connected to the testing branch circuit, and high voltage circuit containing a high voltage source connected to the testing branch circuit in such manner that high voltage applied to the testing branch circuit will simultaneously be applied to the high current circuit, an auxiliary switch in the high current circuit intended to prevent application of high voltage to the high current source, means arranged in the high current source for decreasing the self-resonant frequency thereof and thereby reduce the probability of a breakdown across the auxiliary switch when high voltage is applied from the high voltage source, and means arranged in the high current circuit for preventing application of high voltage across that portion of the high current circuit containing the high current source at any time when a breakdown occurs across the auxiliary switch despite the action of the frequency decreasing means.

The novel features which are considered as characteristic for the invention are set forth in particular in the appended claim. The invention itself, however, both as to its construction and its method of operation, will be best understood from the following description of specific embodiments when read in connection with the accompanying drawing, in which the figure is a schematic wiring diagram of apparatus embodying the present invention.

In the figure the switch 10 is connected in a branch circuit of the apparatus between the junction 11 and ground. To the left of the branch circuit is connected the high current circuit. This latter circuit includes a high current source 20, a pair of current limiting choke coils 21 and 22 in series and an auxiliary switch 23. The switches 10 and 23 are shown in their open positions.

Arranged in the high current circuit and connected between the auxiliary switch 23 and the choke coil 22 is a series combination including a switch 24 and a capacitor 26. A second series combination is arranged in the high current circuit and includes a spark gap 27, a resistor 28 and a capacitor 29.

To the right hand side of the branch circuit is connected the high voltage circuit including a high voltage source 30. Connected between the high voltage source 30 and the junction 11 is an inductance 31 and an electrically controllable spark gap 32. Also arranged in the high voltage circuit is the series combination made up of the resistor 33 and the capacitor 34.

In operation the switches 10 and 23 are first closed so that the high current flows from the source 20 through the chokes 21 and 22, auxiliary switch 23 and the switch 10 under test. None of the high current can reach the high voltage source 30 because the controllable spark gap 32 presents an open circuit thereto.

After the desired short time interval both switches are caused to open by means of electrically controlled mechanisms not shown. When the high current through switch 10 reaches its zero value the spark gap 32 electrically controlled by a device reacting to the high current is ignited so that an arc is established thereacross, i.e., it breaks down in which case the entire high voltage from the high voltage source 30 is applied across the open terminals of the test switch 10 for the high voltage test.

The control device for the electric spark gap 32 may be of any conventional type suitable for igniting the spark gap 32 depending upon the current flow in the high current circuit including the test switch 10. A control device of such type is disclosed e.g. in U.S. Patent No. 2,508,954 of May 23, 1950. In the figure such a control arrangement is shown diagrammatically as comprising a transformer 35 having its primary winding connected in the high current circuit while its secondary winding is connected by conductors 37 to auxiliary electrodes 36 in the spark gap 32. When energy derived from the high current circuit by the transformer 35 is applied to the auxiliary electrodes 36 a spark or arc is formed thereacross which serves to ignite the spark gap 32 in the high voltage circuit.

It can be seen that the open auxiliary switch 23 normally prevents any high voltage from being applied across the high current source or from reaching the high current source. For this reason the switches 10 and 23 are normally opened at a period shortly before the alternating current passing through the switch under test reaches its zero value. As is well known it is common to use transformers to provide the high current necessary for the switch tests. The transformers introduce inductance into the high current circuit. Due to the capacitance between the adjacent windings of the inductance, the circuit has some frequency at which it resonates, usually called the self-resonant frequency.

Due to the above-described self-resonant frequency of the high current circuit it is possible for the switch 23 to break down. From the arrangement of the circuit it is apparent that such an event means an incorrect switch test as the high current circuit is connected in parallel with the switch 10. Of course, the breakdown of the switch 23 would also impair its electrical characteristics. Therefore, in accordance with the principles of the present invention, when necessary, the switch 24 of the high current circuit is closed placing the capacitor 26 in parallel across the high current circuit. This markedly increases the capacitance of the high current circuit, thereby decreasing its self-resonating frequency and greatly reducing the probability of a breakdown across the switch 23 of the high current circuit.

It is possible, however, to have such a high voltage applied across the test switch for such a period of time that the switch 23 may break down even with the extra capacitive protection provided by the capacitor 26. In this event it is possible for the high voltage to be applied across the output terminals of the high current source 20. To avoid this and to cooperate with the capacitor 26 a series combination is connected across the output terminals of the high current source 20, each combination includes the spark gap 27, the resistor 28 and the capacitor 29. It is, therefore, apparent that in the event the high voltage applied across the switch 23 causes it to break down this high voltage will cause a discharge in the spark gap 27 effectively shortcircuiting the high current source 20. The resistor 28 provides damping resistance for the current in this protective circuit and additional protection is provided by the protective capacitor 29. Of course, it is apparent that the spark gap 27 may be adjusted at some predetermined distance depending upon the magnitude of the high voltage from which it is desired to protect the high current source. The values of the damping resistor 28 and the protective capacitor 29 are also chosen depending on the frequency of the applied high voltage.

The frequency of the applied high voltage is predetermined by the series combination of the resistor 33 and capacitor 34. It is therefore apparent that by using the apparatus embodying the principles of the present invention it is possible to test a switch for its high current and high voltage interrupting capacity using either a direct current or an alternating current voltage. This apparatus also permits the use of separate high current and high voltage sources and the various elements thereof cooperate to prevent any interaction between the high current and the high voltage circuits.

It will be understood that each of the elements described above, or two or more together, may also find a useful application in other types of testing apparatus differing from the types described above.

While the invention has been illustrated and described as embodied in switch testing apparatus, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claim.

What is claimed as new and desired to be secured by Letters Patent is:

In a switch testing apparatus, in combination, a testing branch circuit adapted to contain the switch to be tested; a high current circuit including a high current source connected to said testing branch circuit; a high voltage circuit containing a high voltage source connected to said testing branch circuit in parallel with said high current circuit, and including means for applying high voltage from said high voltage source to said branch circuit; an auxiliary switch in said high current circuit which in open position severs the connection between said high current source and said branch circuit and thereby is ordinarily adapted to prevent application of high voltage to said high current source; frequency decreasing means comprising a series combination of a switch and a capacitor arranged in said high current circuit for decreasing the self-resonant frequency thereof and thereby reducing the probability of a breakdown across said auxiliary switch when in open position and when said switch to be tested is moved to an open position, said series combination being connected in parallel with said high current source at a point between said auxiliary switch and said high current source; and a second series combination of a spark gap, a damping resistor, and a protective capacitor, said series combination being arranged in said high current circuit in parallel with said high current source for preventing application of high voltage across the portion of said high current circuit containing said high current source at any time when a breakdown occurs across said auxiliary switch despite the action of said frequency decreasing means.

References Cited in the file of this patent
UNITED STATES PATENTS

| | | |
|---|---|---|
| 2,104,629 | Willheim | Jan. 4, 1938 |
| 2,222,711 | Grosse | Nov. 26, 1940 |